United States Patent [19]

Kabler et al.

[11] 3,735,306

[45] May 22, 1973

[54] MAGNETIC FIELD SHIM COIL STRUCTURE UTILIZING LAMINATED PRINTED CIRCUIT SHEETS

[75] Inventors: Donald J. Kabler, Fremont; Robert E. Gang, Sunnyvale; William O. Reeser, Jr., Fremont, all of Calif.

[73] Assignee: Varian Associates, Palo Alto, Calif.

[22] Filed: Sept. 15, 1971

[21] Appl. No.: 180,685

Related U.S. Application Data

[63] Continuation-in-part of Ser. No. 82,878, Oct. 22, 1970, abandoned.

[52] U.S. Cl. ....................336/192, 324/0.5, 336/200, 336/232

[51] Int. Cl............................H01f 15/10, H01f 27/28

[58] Field of Search......................336/200, 232, 192; 317/123; 324/0.5

[56] References Cited

UNITED STATES PATENTS

| | | | |
|---|---|---|---|
| 2,874,360 | 2/1959 | Eisler | 336/200 UX |
| 2,911,605 | 11/1959 | Wales, Jr. | 336/232 X |
| 3,002,260 | 10/1961 | Shortt et al. | 336/200 X |
| 3,089,106 | 5/1963 | Saaty | 336/200 |
| 3,469,180 | 9/1969 | Anderson | 324/0.5 H |
| 3,515,979 | 6/1970 | Golay | 324/0.5 H |

*Primary Examiner*—Thomas J. Kozma
*Attorney*—Stanley Z. Cole and Gerald M. Fisher

[57] ABSTRACT

A plurality of separate electrical circuits, for example, electrical coils each formed by printed circuit techniques on a plurality of insulating sheets mounted together in laminated fashion. The terminals of each circuit are brought out to one edge of its mounting sheet at a location displaced from the position of the terminals of the other circuits in the laminated structure, recesses in the terminal edges of the upper sheets in the laminated stack exposing the terminals on the sheets below. Two separate sets of the laminated structure are employed, matching terminals being in alignment between the two sets for easy electrical interconnection.

20 Claims, 4 Drawing Figures

INVENTORS
DONALD J. KABLER
ROBERT E. GANG
WILLIAM O. REESER JR.
BY Gerald M. Fisher
ATTORNEY

INVENTORS
DONALD J. KABLER
ROBERT E. GANG
WILLIAM O. REESER JR.

BY V. F. Cleary

ATTORNEY

MAGNETIC FIELD SHIM COIL STRUCTURE UTILIZING LAMINATED PRINTED CIRCUIT SHEETS

This invention is a continuation-in-part application of copending patent application Ser. No. 82,878 filed Oct. 22, 1970 and now abandoned.

BACKGROUND OF THE INVENTION

Highly uniform, homogeneous and strong unidirectional magnetic fields are needed for certain present-day scientific instruments such as, for example, high resolution nuclear magnetic resonance spectrometers.

Various techniques have been employed to control undesired magnetic field gradients in the magnetic gap between the pole faces of an electro or permanent magnet, including electrical shims or coils disposed at selected locations within the gap and supplied with controlled electrical currents to eliminate undesired field gradients. A plurality of separate shim coil circuits have been employed which operate independently and in orthogonal fashion so that each gradient may be controlled independently of the other gradients.

Such shim coil apparatus is described in the following U.S. Pat. Nos. 3,469,180 entitled "Apparatus for Improving the Homogeneity of a Magnetic Field" issued Sept. 23, 1969; 3,488,561 entitled "Apparatus for Controlling Magnetic Fields" issued Jan. 6, 1970, and 3,515,979 entitled "Magnetic Field Control Apparatus" issued June 2, 1970.

Electrical shims made in accordance with the techniques of the above patents take the form of two spaced-apart parallel coil structures, each structure comprising a plurality of electrical coil circuits including one or more coils, each coil circuit being independent and unconnected with the other coil circuits in the structure. The coil circuits in one structure have similar, matching coil circuits in the other structure, the matching coil circuits in the two structures being interconnected, each matched interconnected coil circuit being connected to a current source independent of the current sources connected to the other matched coil circuits.

In order to maintain the thickness of the coil structures at a minimum so that they occupy the minimum amount of the space in the magnet gap, only those coil circuits which will give the most significant results are employed, and they are wound in flat planes with thin wire on sheets of insulation.

To operate properly it is necessary that each of the coil circuits be oriented properly in the structure and that each coil circuit be electrically connected with its matching circuit in the other structure. This requires a great deal of care on the part of the technician manufacturing the coil sets, and one incorrect connection will spoil the structure.

SUMMARY OF THE PRESENT INVENTION

In the present invention a novel structure is employed in the fabrication of the shim coil sets which results in a minimum thickness of coil structure and which insures that the coil circuits cannot be positioned incorrectly in the structure.

Each separate coil circuit is formed on a thin sheet of insulating material by well-known printed circuit techniques, the individual sheets than being affixed together in a stack by a spray adhesive, the sheets insulating each circuit from the next in the stack. The terminals of each circuit are brought out to one edge of the associated sheet, these terminal edges being in alignment, the terminals of each sheet being positioned at a location different than that for the terminals of the other circuits in the stack. Each of the sheets in the stack which has one or more other sheets beneath it has a recess in its terminal edge which clearly exposes all of the terminals on the lower sheets. Thus, after stacking, all of the terminals are positioned along one edge of the stack with all the terminals exposed for easing terminal wiring. In addition, when the two coil structures are positioned in the proper spaced-apart parallelism, the terminals of the matched coil circuits which are to be interconnected are positioned in alignment.

This fabrication insures that the individual coil circuits cannot be positioned upside down in the stack and that the coil circuits in one stack will not be mismatched with the coil circuits in the opposite stack. The fabrication results in a relatively thin coil structure so that additional coils providing extended control may be incorporated with little increase in overall thickness.

This technique may be employed in the fabrication of magnetic coil structures for use in creating magnetic field vectors for purposes other than the shimming of unidirectional magnetic fields; for example, electrical coil structures for the magnetic field control of electron beam alignment and focussing may utilize coil structures fabricated in accordance with the present invention.

DESCRIPTION OF THE PREFERRED EMBODIMENT

Figure 1:
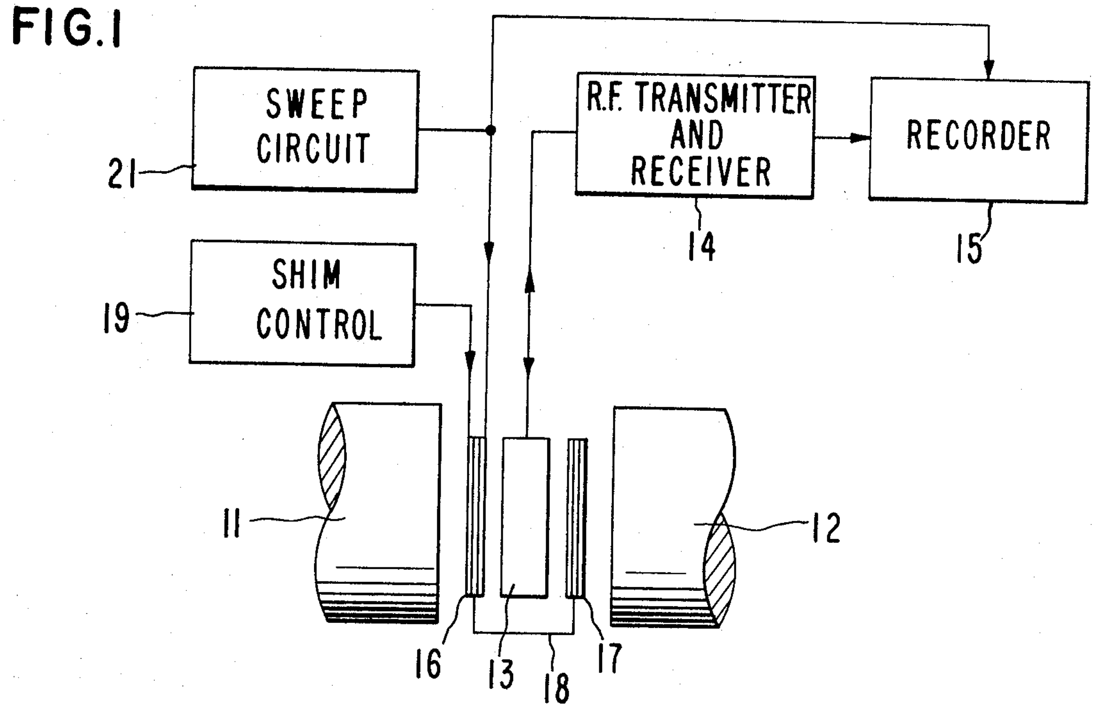
FIG. 1 is a schematic diagram showing a set of shim coils straddling a nuclear magnetic resonance sample probe in a magnet gap, the shim coil structure incorporating the improvement of the present invention.
Figure 3:
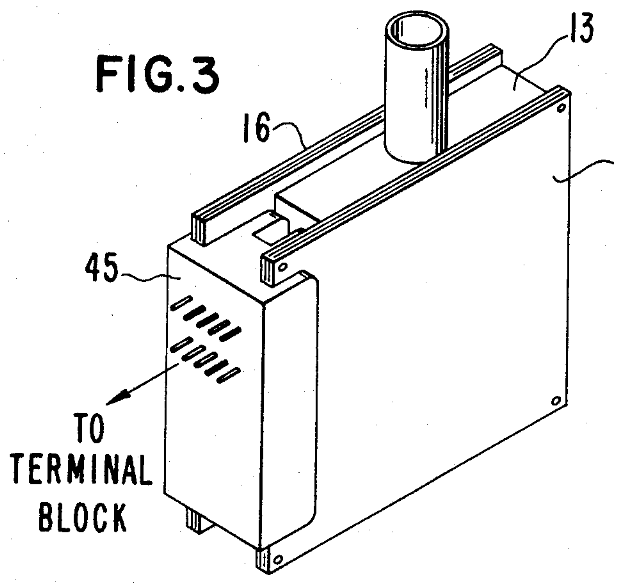
FIG. 3 is a perspective view of the shim coil structure mounted on the probe.

Referring to FIGS. 1 and 3, the standard nuclear resonance spectrometer includes a magnet, represented by the magnet poles 11 and 12, and a probe 13 which carries the sample, sample spinner, preamplifier circuit, and radio frequency driving coil (all well-known and therefore not shown). The transmitter-receiver circuit 14 supplies the driving radio frequency to the probe coil, and the detected magnetic resonance signal is fed to the recorder means 15. Two spaced-apart parallel shim coil structures 16 and 17 are positioned between the poles 11, 12, the separate coil circuits in the structures being electrically connected together — for example, in series as represented by lead 18. Each pair of coil circuits is controlled by independent current sources in shim control circuit 19. Sweep coils used to modulate the magnetic field may also be incorporated in the shim coil structures and are controlled from sweep circuit 21. The coil structures 16 and 17 are generally affixed on either side of the probe 13 in proper mutual alignment and alignment with the sample.

Figure 2:
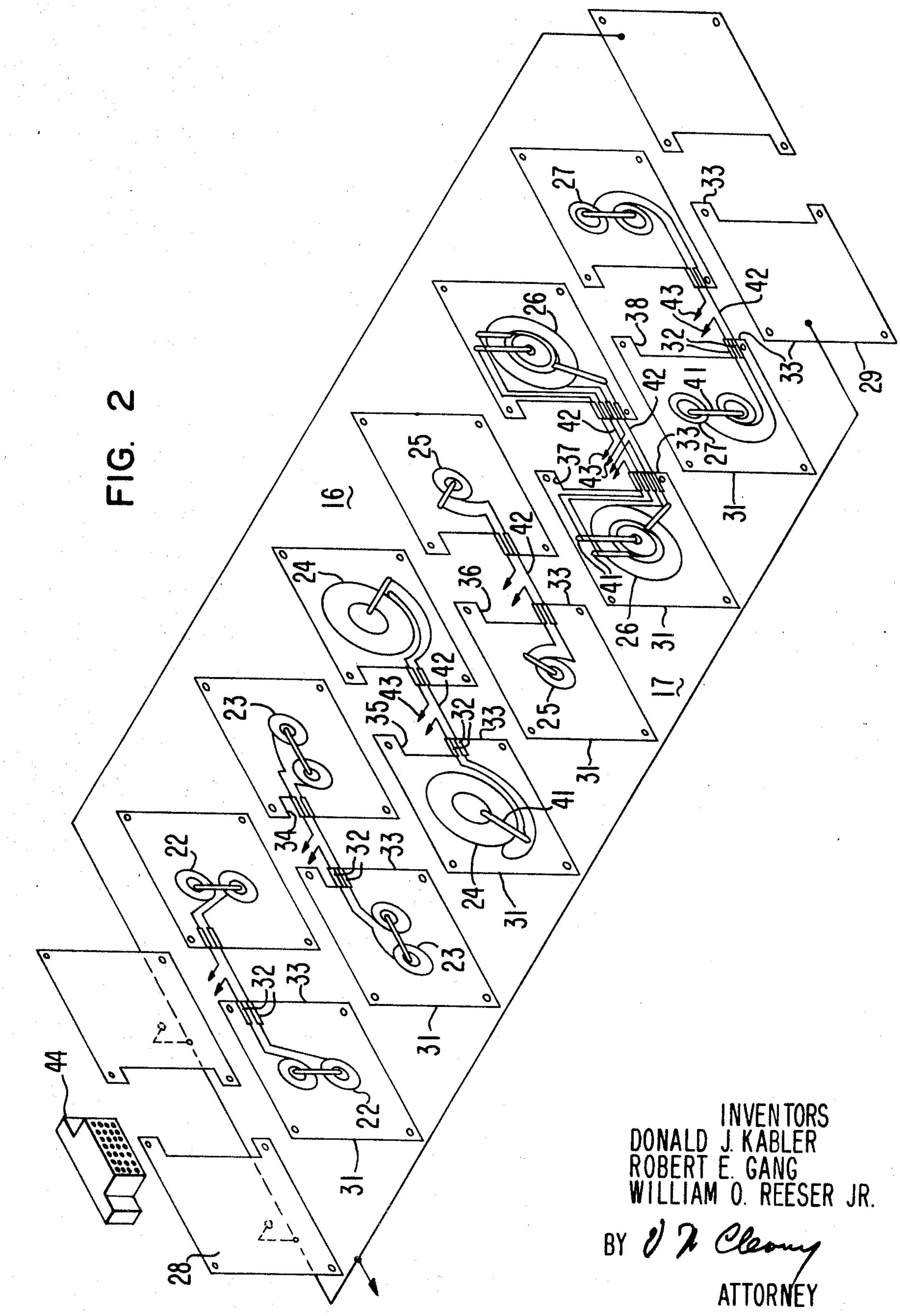
FIG. 2 is an exploded perspective view of the improved shim coil structure.

An exploded view of the shim coil structure is shown in FIG. 2, including the two separate left and right-hand coil structures 16 and 17, respectively. When assembled, the laminated structures 16 and 17 are mounted so as to be mutually parallel, as shown in FIG. 3 rather than in the linear alignment shown in this view.

In this particular embodiment each structure comprises six coil circuits, i.e., the YZ gradient coil 22, X gradient coil 23, sweep modulation coil 24, Z coil 25, curvature coil circuits 26, and Y gradient circuit 27 and two end shields 28 and 29. The end plates or sheets 28 and 29 are made of a two mil thick Capton base, a polyimide film, with a 1.2 mil copper laminate on the outside surfaces. The sheets 31 which carry the coil circuits 22 – 27 are also copper laminated Capton films or sheets, the circuits being formed from the cooper laminate by standard printed circuit techniques. The circuits are formed on the upper surfaces of the sheets 31 as viewed in the drawing.

The terminals 32 for each of the coil circuits are formed on one edge 33 of each sheet 31, the terminals being located at progressively lower positions at the edge for the circuits 22 – 27, the terminals of circuit 22 being in the highest position and the terminals of circuit 27 being in the lowest position. The terminals of the right and left side matching coil circuits are positioned at the same heights and in alignment.

The sheet carrying coil circuit 23 has a recess 34 cut into edge 33 aligned with the terminals of circuit 22 below. The sheet carrying circuit 24 has a recess 35 in its edge 33 large enough to expose the terminals of both circuits 22 and 23 below. Recesses 36, 37 and 38 in the sheets carrying circuits 25, 26 and 27, respectively, expose the terminals of all the circuits in the layers underneath.

The coils of each circuit are interconnected at their internal terminals or endings where necessary by 2 mil thick copper strips or jumpers 41 extending between the internal circuit ends, the strips being insulated from the coil circuits by a suitable insulation, such as 3 mil Capton film, and electrically connected to the coil circuit ends by a pressure and heat weld, for example.

All of the sheets in a set are secured together in a laminated stack by spraying a thin film of adhesive material such as Ablestik on the surfaces, e.g., 0.0002 inch thick; a pressure of 10 lbs/sq.in. is than applied at a temperature of 275°F for about 1 hour. Each laminate coil structure 16, 17 is about 0.037 inch thick when formed, which is considerably thinner than prior forms of coil structures, a very important feature due to the limited space available for the coil structure in the magnet gap.

A coil circuit from the right-hand structure cannot be inadvertently assembled in the left-hand structure and vice versa since its terminals 32 would be facing in the wrong direction and would be covered over by the sheet 31 on which the coil circuit is formed. Each coil circuit must also be placed in its correct position or layer in the stack or its terminals will be covered over by another sheet and this problem will be clearly evident to the assembler.

The alignment terminals 32 of the matching pairs of coil circuits in the left and right-hand structures which are to be series-connected are wired together, represented by leads 42, after the structures 16, 17 have been positioned in spaced-apart parallelism, and the other terminals are wired to leads 43 which extend from the structures to a plug connector 44 for connection with the shim control circuit 19 and the sweep circuit 21. The terminal end of this structure is then potted in a suitable insulating material 45. The copper films on the end shields are also electrically connected together and grounded.

While the coil sets such as 22—22 in FIG. 2 are shown electrically connected together in series, it should be understood that the coil sets could be connected together in parallel for certain applications, or they may be left unconnected to each other and each set of terminals brought out for external connection as desired for the particular utilization of the circuit.

Figure 4:
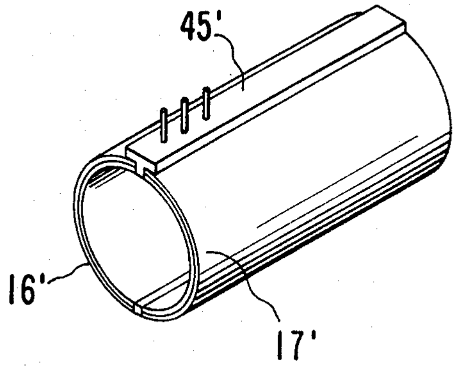
FIG. 4 is a perspective view of a cylindrical-shaped coil structure embodiment of the present invention.

Although this novel electrical circuit structure has been described with reference to its use as an electrical shim coil structure for controlling the homogeneity of a unidirectional magnetic field and providing sweep coils for the field, other types of electrical circuits may be assembled for use in high density applications by this laminating technique. For example, many systems require the alignment and/or focussing of electron beams by the application of magnetic field components to the beam. A magnetic field producing system utilizing electrical conductors or coils and made by the technique disclosed herein benefits from the thin laminate structure and the substantial reduction in the incidence of misassembly of the sheets of the individual stack. Although the two laminated structures 16 and 17 of FIG. 3 are shown as flat structures, the laminated stack may take other shapes. For example, the separate sections 16' and 17' may each take a half-cylinder shape as shown in FIG. 4 such that the two separate sections will enclose a cylindrical volume. This is very suitable for an electrical coil structure for controlling an electron beam passing axially through the cylinder.

What is claimed is:

1. Electrical circuit apparatus comprising a plurality of separate electrical circuits mounted on a plurality of insulating sheets, certain ones of said electrical circuits being mounted on one side of a different one of said insulating sheets, the insulating sheets being stacked one on top of the other, the sheets being stacked such that the electrical circuits on the one side of one sheet are positioned under the other side of the next sheet in the stack, the electrical terminals of each of the circuits on each of the sheets being brought out to at least one terminal edge of said sheet, the terminal edges of the plurality of sheets in the stack being in alignment, the terminals of each of the sheets being located at a position along the terminal edge different than the terminal positions of the other sheets in the stack, each sheet in the stack having a recess in its terminal edge to expose the terminals on the terminal edges of each of the sheets below said sheet in the stack.

2. An electrical apparatus as claimed in claim 1 wherein said electrical circuits comprise printed conductors on said insulating sheets.

3. An electrical structure as claimed in claim 2 wherein electrical connections are made between separate circuits on a sheet by conductive jumpers affixed to internal terminals of said circuits and insulated from other conductors on the sheet.

4. An electrical apparatus as claimed in claim 1 wherein a thin film of adhesive between sheets serves to secure the sheets in said stacks.

5. An electrical apparatus as claimed in claim 1 wherein one of said sheets has a recess in its terminal edge which is aligned with and exposes the terminals on the sheet below, the terminals on said one sheet being positioned adjacent said recess, and wherein an upper sheet above said one sheet has a recess in its terminal edge which is aligned with and exposes the terminals of both said one sheet and the sheet below said one sheet, the terminals on said upper sheet being positioned adjacent the recess in said upper sheet.

6. An electrical apparatus as claimed in claim 1 wherein said electrical circuits are printed conductors on said insulating sheets.

7. An electrical apparatus as claimed in claim 1 wherein said electrical circuits are electrical coils.

8. An electrical apparatus as claimed in claim 7 wherein said coils are printed conductors on said insulating sheets.

9. Electrical apparatus comprising a pair of spaced-apart electrical structures, each structure including a plurality of separate electrical circuits, each circuit of one set having an associated circuit in the other set, the associated circuits in the two sets being electrically coupled together, a plurality of insulating sheets, certain ones of said electrical circuits in a set being mounted on one side of a different one of said insulating sheets, the insulating sheets in each set being stacked one on top of the other, the two stacks of sheets being stacked such that the electrical circuits on the one side of one sheet are positioned under the other side of the next sheet in the stack, the electrical terminals of each of the circuits on each of the sheets being brought out to one edge of said sheet, the terminal edges of the plurality of sheets in a stack being in alignment, the terminals of each of the sheets in a set being located at a position along the terminal edge different than the terminal positions of the other sheets in the set, each sheet in the stack having a recess in its terminal edge to expose the terminals on the terminal edges of each of the sheets below said sheet in the stack.

10. An electrical apparatus as claimed in claim 1 wherein said electrical circuits are printed conductors on said insulating sheets.

11. An electrical apparatus as claimed in claim 10 wherein series connections are made between separate circuits on a sheet by conductive jumpers affixed to internal terminals of said circuits and insulated from other conductors on the sheet.

12. An electrical apparatus as claimed in claim 9 wherein the two sets of stacked sheets are mounted together in spaced-apart parallelism at their terminal edges.

13. An electrical apparatus as claimed in claim 9 wherein a thin film of adhesive between sheets serves to secure the sheets in said stacks.

14. An electrical apparatus as claimed in claim 9 wherein one of said sheets has a recess in its terminal edge which is aligned with and exposes the terminals on the sheet below, the terminals on said one sheet being positioned adjacent said recess, and wherein an upper sheet above said one sheet has a recess in its terminal edge which is aligned with and exposes the terminals of both said one sheet and the sheet below said one sheet, the terminals on said upper sheet being positioned adjacent the recess in said upper sheet.

15. An electrical coil apparatus as claimed in claim 14 wherein said electrical circuits are printed conductors on said insulating sheets.

16. An electrical apparatus as claimed in claim 15 wherein series connections are made between separate circuits on a sheet by conductive jumpers affixed to internal terminals of said circuits and insulated from other conductors on the sheet.

17. An electrical apparatus as claimed in claim 14 wherein the two sets of stacked sheets are mounted together in spaced-apart parallelism at their terminal edges.

18. An electrical apparatus as claimed in claim 14 wherein a thin film of adhesive between sheets serves to secure the sheets in said stacks.

19. An electrical apparatus as claimed in claim 9 wherein said electrical circuits are electrical coils.

20. An electrical apparatus as claimed in claim 19 wherein said electrical coils are printed conductors on said insulating sheets.

* * * * *